(12) United States Patent
Athale et al.

(10) Patent No.: US 8,620,996 B2
(45) Date of Patent: Dec. 31, 2013

(54) METHOD AND APPARATUS FOR DETERMINING A GROUP PREFERENCE IN A SOCIAL NETWORK

(75) Inventors: Anant Athale, Schaumburg, IL (US); John Krahenbuhl, McHenry, IL (US); Thomas Michael Tirpak, Glenview, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1093 days.

(21) Appl. No.: 11/942,537

(22) Filed: Nov. 19, 2007

(65) Prior Publication Data

US 2009/0132652 A1    May 21, 2009

(51) Int. Cl.
*G06F 15/16* (2006.01)
*G06Q 99/00* (2006.01)

(52) U.S. Cl.
USPC ........................... 709/203; 709/204; 705/319

(58) Field of Classification Search
USPC ...................................... 709/203, 204; 705/9
See application file for complete search history.

(56) References Cited

U.S. PATENT DOCUMENTS

| | | | |
|---|---|---|---|
| 6,623,427 B2 | 9/2003 | Mandigo | |
| 7,016,307 B2 | 3/2006 | Vasudev et al. | |
| 7,117,254 B2 | 10/2006 | Lunt | |
| 2002/0123924 A1 | 9/2002 | Cruz | |
| 2003/0004782 A1 | 1/2003 | Kronby | |
| 2003/0037144 A1 | 2/2003 | Pestoni et al. | |
| 2005/0159998 A1* | 7/2005 | Buyukkokten et al. | 705/11 |
| 2005/0210512 A1 | 9/2005 | Anderson et al. | |
| 2005/0267766 A1* | 12/2005 | Galbreath et al. | 705/1 |
| 2006/0031203 A1 | 2/2006 | Rosenbaum et al. | |
| 2006/0042483 A1* | 3/2006 | Work et al. | 101/91 |
| 2006/0095516 A1 | 5/2006 | Wijeratne | |
| 2006/0112098 A1 | 5/2006 | Renshaw et al. | |
| 2007/0162458 A1* | 7/2007 | Fasciano | 707/10 |
| 2007/0204308 A1 | 8/2007 | Nicholas et al. | |
| 2007/0255785 A1* | 11/2007 | Hayashi et al. | 709/204 |

OTHER PUBLICATIONS

Prasad, Nagendra et al., "A Multi-Agent System for Meting Out Influence", *Proceedings of the Eleventh Conference on Innovative Applications of Artificial Intelligence (IAAI Â?99)*, M. V. Nagendra Prasad & Joseph F. McCarthy Center for Strategic Technology Research Accenture 3773 Willow Road Northbrook IL 60062 USA +1 847 714 {2062,2260} nagendrap@yahoo.com, mccarthy@cstar.accenture.com,(Jan. 1, 1999).

(Continued)

*Primary Examiner* — Ranodhi Serrao (57) ABSTRACT

A method (100) of electronically determining a group preference in a social network from multiple individual preferences of members of the social network is provided. One embodiment of the method (100) uses a combination of an individual's importance to a social network and a social network's importance to the individual as weighting factors when combining the individual preferences to generate a shared set of preferences. This group preference may be used to select content for broadcast to the network, including audio content and video content. A social network group preference determination apparatus (401) can determine the individual's importance to the social network by interrogating or monitoring the communication activity of portable electronic communication devices (402) belonging to the members of the social network.

16 Claims, 6 Drawing Sheets

(56) References Cited

OTHER PUBLICATIONS

McCarthy, Joseph F., et al., "MUSICFX: An Arbiter of Group Preferences for", *Proceedings of the 1998 ACM Conference on Computer Supported Cooperative Work* (CSCW Â?98), Joseph F. McCarthy Theodore D. Anagnost Center for Strategic Technology Research Accenture 3773 Willow Road Northbrook, IL 60062 USA +1 847 714 2260 mccarthy@cstar.accenture.com,(Jan. 1, 1998).

Boccaletti, et al., "Complex networksL Structures and dynamics. IN: Physics Reports, vol. 424,", published Jan. 10, 2006. Retrieved on Jul. 4, 2010. pp. 175-308, (Jan. 10, 2006).

Young, Lee W., "PCT Search Report and Opinion".

Wong, Stephen T., "Preference-Based Decision Making for Cooperative Knowledge-Based Systems", (Oct. 1994),407-435.

\* cited by examiner

METHOD AND APPARATUS FOR DETERMINING A GROUP PREFERENCE IN A SOCIAL NETWORK

BACKGROUND

1. Technical Field

This invention relates generally to group decision making in social networks, and more particularly to a method and apparatus for determining a group preference in a social network from a plurality of individual preferences of members of the social network weighted by importance of the individual to the network and, optionally, the importance of the network to the individual.

2. Background Art

With the advent of electronic communication, the study of group behavior among humans is becoming more advanced. When human-to-human communication was primarily word of mouth, the study of the communication patterns and trends was difficult. Today, however, people frequently communicate electronically. Common forms of electronic communication include telephone calls, e-mail correspondence, text messaging, instant messenger communication, facsimile communication, and so forth. While communication is sometimes done on a one-off basis, most communication occurs between groups of friends, family members, or co-workers. This "group communication" has given rise to the study of social networks.

A "social network" is commonly referred to as a social structure having a group of people, or members, that are linked together by one or more common links. These links may include friendship interdependency, familial ties, employment status, financial interdependency, common likes, common dislikes, attendee commonality at public gatherings, and so forth. Social scientists have begun to study social networks analytically to determine, for example, how information is shared or how members of a group tend to act. Social scientist J. A. Barnes helped to pioneer the study of interdependency patterns that transect traditional groups, such as families or tribes.

The members of a social network are generally referred to as "nodes." Each node is linked to another by a relationship or communication channel, often called a "tie." While nodes are the participants, ties are the channels through and by which information is shared. When studying social networks analytically, scientists often map the members by drawing lines representing ties between each member. Data can be gathered from such maps. By way of example, a particular member's social relevance may be determined by the number of ties he has with other nodes in the network.

One problem associated with social networks is that many social networks consist of interconnected peer nodes, and there is generally no hierarchical structure for centralized communication. The members of social networks communicate with other nodes. However, there is generally no central node that acts as a leader. This can be problematic in the decision making process. If, for example, delegates for a convention gather in a meeting hall, each delegate will know some others, but chances are no delegate knows everyone in the hall. Imagine that the delegates need to collectively determine what to eat for dinner. Where each node talks only to nodes to which they are linked, a chaotic communication process ensues with no central decision being made.

There is thus a need for a method and apparatus for determining a group preference in a social network.

BRIEF DESCRIPTION OF THE DRAWINGS

The accompanying figures, where like reference numerals refer to identical or functionally similar elements throughout the separate views and which together with the detailed description below, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to electronically determining a group preference in a social network from a plurality of individual preferences, each weighted by an importance factor. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of electronically determining the group preference of a social network as described herein. The non-processor circuits may include, but are not limited to, a radio receiver, a radio transmitter, signal drivers, clock circuits, power source circuits, and user input devices. As such, these functions may be interpreted as steps of a method to perform group preference selection in accordance with embodiments of the invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention include a method and apparatus for electronically determining a group preference of a social network from a plurality of individual preferences of the members of the social network. The method and apparatus use an individual's importance to the social network as a weighting factor for weighting the preferences of that individual. Additionally, the importance of the social network to the individual may also be used as a weighting factor. The individual's importance to the social network may be combined with importance of the social network to the individual as a weighting factor. These weighting factors scale, individually, each member's preferences. From the scaled preferences, a shared set of preferences may be obtained. This shared set of preferences, in one embodiment, can be used for the purpose of automatic content selection.

To illustrate by way of example, imagine that one social network is the attendees of a wedding reception. The planners of the wedding reception have hired a band to play music for the attendees. A dance floor is provided.

After food, cake, and toasts, the band desires to know which music will please the attendees. However, some attendees get preferential treatment in the decision making process based upon their importance to the social network and the social network's importance to them.

Considering first the individual's importance to the social network, the bride and groom are highly important members of the social network. The wedding is their special day, and pleasing them is of utmost importance. The bride's parents, who may be paying for the wedding, are also relatively important. The best man and maid of honor, while important, may be lower in "importance priority" than are the bride and groom. While displeasing the best man may be a faux pas, it is lesser such than would be displeasing the bride. Continuing down the list, a friend of a friend of the bride may have a far less importance to the network.

Considering the social network's importance to the individual, the social network of wedding guests will be of high importance to the bride and groom. The bride and groom may each want to communicate with the wedding guests individually. Similarly, the social network of attendees will be of high importance to family members of the bride and groom. Returning to the friend of the friend of the bride, the wedding social network may be of little importance to this member. She may only wish to say hello to the bride. Further, she may not plan on staying for the entire reception.

Each member of the social network, however, may have an individual preference as to what music the band plays. The bride and groom may want to hear a popular song, while the bride's parents want to hear a big band swing song. The best man and maid of honor may want to hear a jazz standard and a classical etude, respectively. The friend of the friend of the bride may want to hear a heavy metal classic.

In accordance with embodiments of the invention, the group preference is determined by using a combination of the individual's importance to the social network and the social network's importance to the individual. These factors scale the individual preferences to determine the group preference. Thus, rather than a one man/woman-one-vote democratic method, and rather than a one-person-picks totalitarian method, a weighted vote selection determines what content—or in this example what music—is played. In contrast to offering across the board fairness, embodiments of the present invention use established means of estimating the importance of a particular member to the social network as one weighting factor, and the importance of the social network to the member as another factor. These factors scale individual preferences to determine a group preference.

In one embodiment, the determination of the group preference is performed by a client-server type system. A server component observes client interaction or communication. The client, which may be a mobile telephone, personal electronic device such as a portable music player, or personal digital assistant, has stored therein individual preferences. The client is capable of electronic communication with other client devices. The server component, in addition to being able to query the clients for the individual preferences, monitors the communication activity of each client to determine estimates of importance relative to the network. The server component is then able to dynamically calculate the user's social capital to generate group preferences for a social event.

The server component can determine the individual's importance to the social network by determining one or more factors associated with social networks. These factors include: the "betweenness" of one or more members to other members of the social network; the "closeness" of the one or more members to the other members; the "centrality degree" of the one or more members relative to the other members; the "flow betweenness" centrality between the one or more members with the other members; the "eigenvector centrality" of the one or more members relative to the other members; the "centralization" of the one or more members; the "clustering coefficient" of the one or more members; the "cohesion" of the one or more members with the other members; the "density" corresponding to the one or more members relative to the social network; the "path length" of the one or more members with the other members; the "radiality" corresponding to the one or more members relative to the social network; the "reach" of the one or more members to the other members; the "structural cohesion" of the one or more members with the other members; the "structural equivalence" of the one or more members with the other members; or the "structural or static holes" in the social network. Each of these factors will be described in more detail below.

The server component can determine the importance of the social network to each member by monitoring feedback from each member. Further, the server component may determine the importance of the social network by implicit analysis of each member's interaction with the network. Characteristics of interaction include each member's participation, recency of interaction, interaction frequency, and so forth. Ranking data observed may either be stored on the client device or on the server component.

Figure 1:
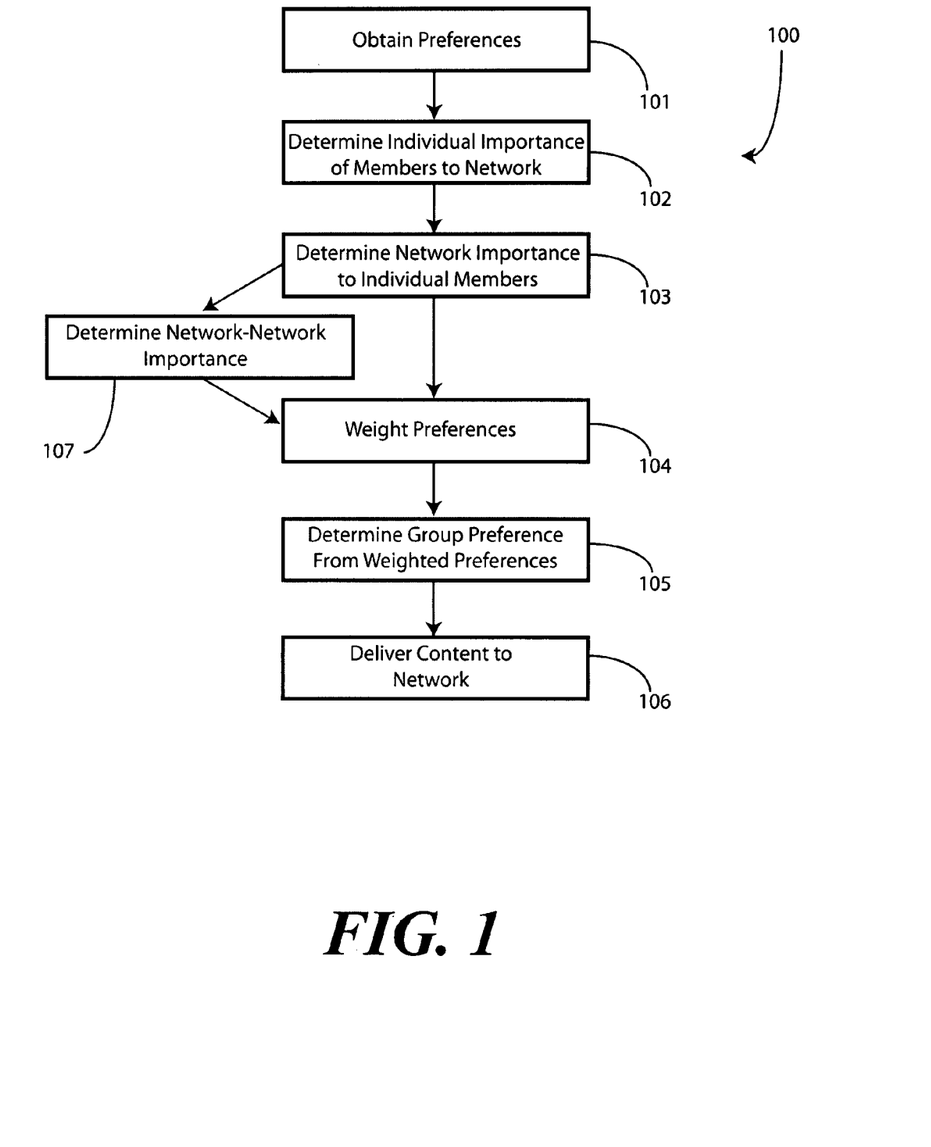
FIG. 1 illustrates one method of electronically determining a group preference in a social network from a plurality of individual preferences of members of the social network in accordance with embodiments of the invention.

Turning now to FIG. 1, illustrated therein is one method 100 of determining a group preference in a social network from a plurality of individual preferences of members of the network in accordance with embodiments of the invention. At step 101, the preferences of the individual members of the social network are obtained. These preferences can be content preferences, such as audio or video to be broadcast at a public gathering. Such content preferences can be obtained by monitoring, for example, public playlists stored within electronic devices being used by the members of the social network. Alternatively, the preferences can be input by the members and stored in the memory of the electronic devices. A central server unit can then monitor and read the preferences electronically. The preferences may also be obtained in response to a query, such as a text message or other questionnaire transmitted by the server unit.

In one embodiment, such as where the members of a social network are congregating at a public gathering, the method 100 determines content preferences by reading electronic devices belonging to the members of the social network. Where each of the members has a portable electronic device having a music player for instance, such as an MPEG player for playing digital music, a server unit is configured to read the play lists of each device. These portable electronic devices could be any of a number of devices, including cellular telephones, MPEG players, pagers, radios, personal computers, and personal digital assistants.

As each electronic device includes digital music stored within, each device includes a corresponding "play list" that included information and details about each song or piece of music stored within the device. The information may include song specific information, like song title, album, artist, release date, lyrics record label, or composer. The information may also include preference information associated with the music, including musical genre, tempo, orchestral composition (i.e. the types of instruments, band members, etc.), and theme. In a peer-to-peer or server-client environment, a central computer reads these play lists to determine member preferences. It will be obvious to those of ordinary skill in the art having the benefit of this disclosure, however, that the invention is not limited to polling electronic devices to obtain preferences. Member push systems, query systems, or predetermined preference databases may be used to obtain individual member preferences as well.

Figure 2:
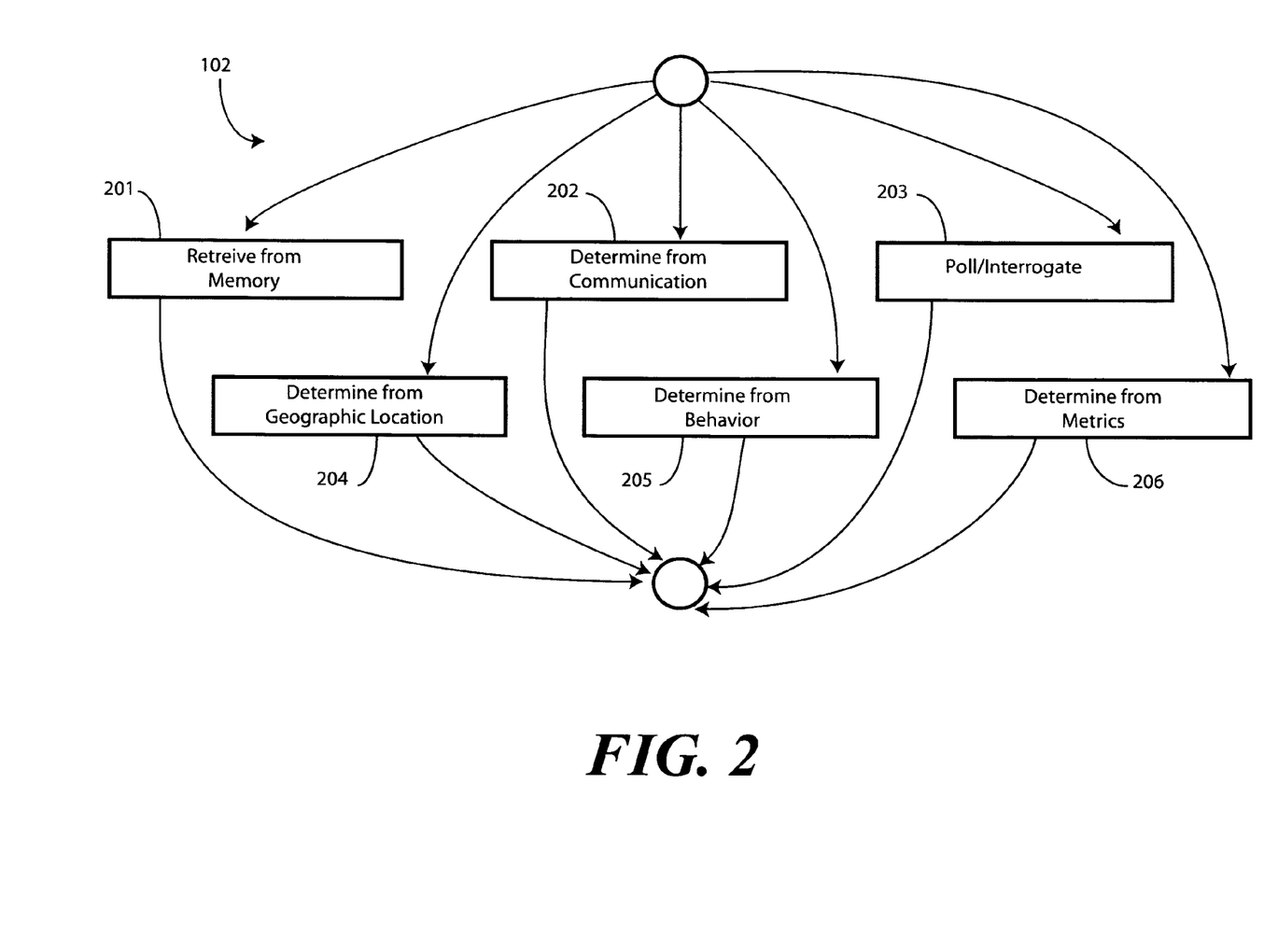
FIG. 2 illustrates exemplary methods of determining an individual member's importance to a social network in accordance with embodiments of the invention.

At step 102, the method 100 determines the importance of each individual to the social network. This can be done in a variety of ways. Turning briefly to FIG. 2, illustrated therein are a few exemplary ways of performing the step 102 of determining the importance of each individual member to the overall social network.

At option 201, the importance of each member is determined by retrieving an importance list from memory. Said differently, the method (100) may determine each member's importance by retrieving predetermined importance data from memory. Such a list may be used, for instance, in the wedding example described above. The planners of the wedding have a guest list. The host may prioritize guests on the list, much as they are when a dinner seating chart is generated. This list of members, ranked by importance to the social network, is then stored in memory. Such a list is then accessed to determine one measurement of each individual's importance to the network.

At option 202, the importance of each member to the social network is determined by monitoring the electronic communications of one or more members of the social network with other members. Where the social gathering is a party, and the social network comprises guests at the party and their corresponding social networks, a central computer can monitor communication between member's electronic devices. A member who sends forty text messages, for example, to other members is likely to be more important to the social network than a member who sends only one text message. Monitoring may be performed by either routing electronic communication through the central computer, or by electronically monitoring peer-to-peer communication within the social network.

At option 203, the importance is determined by responses to polling questions. A central computer interrogates one or more electronic devices belonging to the members of the social network to obtain the individual preferences. By way of example, the central computer can send questions to the electronic devices of each member. One such question may be, "How many other guests do you know?" Or, "How long have you known the host?" By carefully crafting the questions, answers may be used to determine the importance of each member to the social network.

At option 204, the importance is determined by the geographic location of each member of the social network relative to the network. Members who are more centrally located within the social network tend to be more important to the network than do members located on the periphery. For instance, the host of a party may want to be centrally located so as to have more communication channels available. A casual visitor may want to stay closer to the perimeter of the social network, perhaps so as to make an early exit. By electronically monitoring the location of a portable electronic device or electronic identifier belonging to each member, one measurement of an individual's importance to a social network may be obtained.

At option 205, importance is determined by member behavior. In addition to communication frequency, certain member behavior may be indicative of a member's importance to the social network. One example is that of picture taking. A member who constantly takes digital photographs of an event is likely to be more important to the social network as she desires to keep a visual record of the event. By contrast, one who takes no pictures may be indifferent to the event or the social network. By electronically monitoring electronic device activity of each member, such as the number of pictures or movies taken with a camera-enabled mobile telephone, one measurement of a member's importance to a social network may be obtained.

Figure 3:
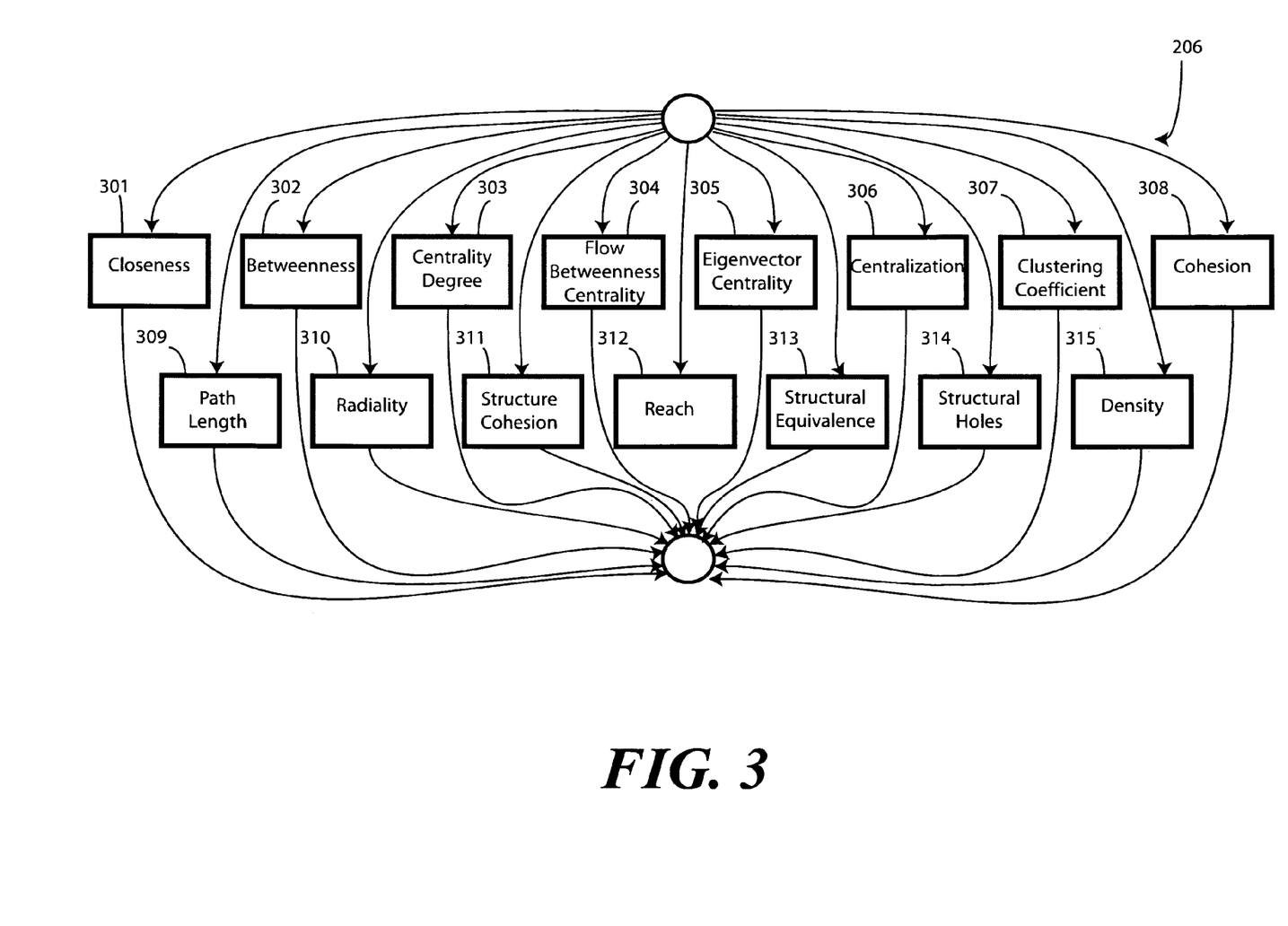
FIG. 3 illustrates exemplary metrics for determining an individual member's importance to a social network in accordance with embodiments of the invention.

At option 206, social network metrics can be measured to determine a member's importance to the social network. Turning now to FIG. 3, illustrated therein are exemplary social network metrics that can be measured by monitoring member's electronic devices to complete option 206 in determining the importance of a member to a social network. Many of these metrics can be measured by monitoring the electronic communication of each of the members, along with the message paths through which information travels.

The first metric 301 is that of closeness. Closeness is a measurement of the degree that one member of a social network is directly or indirectly near the other members of a social network. Such a metric may be measured, for instance, by monitoring the geographic location of an electronic device belonging to one member of the network relative to the geographic location of an electronic device belonging to another member. Closeness is an indicator of the ability of a member of the social network to access information through communication channels with other members. While all communication may not be electronic, the measure of closeness can be indicative of verbal and other forms of communication. One measure of closeness is the inverse sum of the shortest distances between each individual and every other member of the network.

The next metric 302 is that of betweenness. Betweenness is a measurement of the degree that a member is disposed between other members of the social network. Betweenness is also indicative of the extent to which a member has a channel of communication open directly with members that do not have channels of communication between each other. Betweenness is thus an indicator that a member serves as a liason between members. Betweenness is also a measurement of the number of members a member has indirect communication channels to through their direct communication channels. Such a metric may be measured by monitoring the electronic communication trails of messages sent by each member of the social network.

The next metric 303 is that of centrality degree. Centrality degree is a measurement of the number of ties to other members of the social network. The concept of centrality degree was popularized by psychologist Stanley Milgram in a 1967 experiment that gave rise to the notion of "six degrees of separation" in human relationships. Centrality degree, which can be determined by monitoring electronic communication between members, measures how "connected" each member is to the other members of the social network.

The next metric 304 is that of flow betweenness centrality. Flow betweenness centrality is a measurement of the extent to which a member of a social network contributes to the flow of information between all members in the social network. Flow betweenness centrality may be determined by monitoring the electronic communication of each of the members of the network, along with the message paths that each piece of information takes.

The next metric 305 is that of eigenvector centrality. Eigenvector centrality assigns a quantitative ranking to each member of the social network based upon the communication channel connections each member has relative to other members. Known in the art of social networks, eigenvector centrality is a direct measurement of each member's importance to the social network.

The next metric 306 is that of centralization. Centralization is a measurement of a member's link dispersion about other members of the social network. Where the social network is based about a party, for example, many of the communication channels associated with the social network will be dispersed around one or two members, such as the host and hostess or bride and groom. The difference between the number of communication channels between each member, divided by the maximum possible sum of differences, is the centralization measurement.

The next metric 307 is that of the clustering coefficient. When relationships are not previously known, the clustering coefficient is a prediction of how likely any two members of a social network are directly linked—such as being friends or family members. By monitoring the frequency of electronic communication with any one other network member, a central computer can predict how likely to members are linked. Where a particular member has a high clustering coefficient with many other members, that member is likely to be more important to the social network than one who has a low clustering coefficient.

The next metric 308 is that of cohesion. Cohesion refers to a measurement of the direct connectedness of each member to other members of the social network. Known to those of ordinary skill in the art of social networks, cohesive bonds between a certain number of members is indicative of a subgroup of the social network. A member who has a high cohesion measurement with many sub-groups is likely to be more important to the social network than a member who is not affiliated with many sub-groups.

The next metric 309 is that of path length. Path length is simply a measurement of the distance between one member of the network to all the other members of the network. An invitee of the party who knows many attendees will have a shorter path length to the attendees than will a friend the invitee brings to the party who knows no one. As such, the invitee will typically be more important to the social network, as is indicated by the shorter path length, than will the friend who knows no one and thus has a longer path length to the other attendees (a path length that passes through the invitee).

The next metric 310 is that of radiality. Radiality is a measurement of an individual member's reach into the network for providing new information. By way of example, where a member initiates an electronic communication, such as "The chicken is delightful," radiality measures how much that new information permeates the social network. A member offering higher radiality potential tends to be more important to the network.

The next metric 311 is that of structural cohesion. Structural cohesion is a measurement of the number of members of a social network that may cause the social network to disappear if they are removed from the social network. By way of example, where partygoers are attending a wedding reception, most all will disperse once the bride and groom leave the reception. Thus, the bride and groom exhibit a strong structural cohesion. High structural cohesion is indicative of high importance to a network.

The next metric 312 is that of reach. Reach is simply a measurement of the degree to which any member can communicate with other members of the social network. In short, reach is an indication of how many other members one particular member "knows."

The next metric 313 is that of structural cohesion. Structural cohesion, known to those of ordinary skill in the art of social networks, is a measurement of common communication channel linkages shared by members of the social network. A higher structural cohesion measurement is indicative of greater importance to the social network.

The next metric 314 is that of structural holes. The concept of structural holes actually refers to the ability of a member in a social network to fill structural holes. A structural hole is a gap in communication channels. By filling a structural hole, perhaps by introducing two members, social network scientists hypothesize that the introducer has influence over the communication occurring within the newly made channel. Further, the ability to fill structural holes is indicative of the number of members that a particular member "knows." As such, a member with the propensity to fill structural holes tends to be more important to a give social network.

The next metric 315 is that of density. Density is a measurement of a member's communication links as a proportion of the members of the network. Similar to centrality degree, density measures the proportion of communication channels existing in a social network relative to all possible communication channels. A higher measurement of density is indicative of a high importance to the social network.

Turning now back to FIG. 1, once the importance of the individual member to the social network is known, measured, or estimated, at step 103 the method 100 optionally determines the importance of the social network to each of the individual members. This step 103 is performed by monitoring the electronic interaction that the member has with other members in the social network. For instance, a central computer can monitor the member's electronic communication with other members. Alternatively, the central computer may measure a duration since, or "recency" of, communication with other members of the social network. The interaction frequency with other members of the social network can also be monitored. From this information, ranking data may be stored either locally with the central computer or with the user on their portable electronic device. This ranking data indicates the importance of the social network to the member. By way of example, a family reunion may be more important to a person than would a friend of a friend's birthday party.

Once the importance of the social network to the individual is known, in one embodiment the method 100 optionally determines the importance of a social network to other social networks at step 107. Such may be the case where multiple social networks are vying for content broadcasts. For example, at a party, members may want to hear music over the loudspeaker system. However, if broadcasters from an emergency broadcasting system need to broadcast weather related news, the importance of the emergency network would likely trump the party network in importance. As such, the emergency network's request should be honored over the partygoers' collective request. For this reason, the network to network importance is optionally determined at step 107.

After determining the necessary importance factors, the method 100 weights each of the individual preferences with a weighting factor at step 104. In one embodiment, the weighting factor is simply the individual's importance to the network. As such, each of the individual preferences are weighted with a corresponding individual importance. In another embodiment, the weighting factor is a combination of the individual's importance to the network and the importance of the network to the individual. As such, each of the individual preferences is weighted by both an individual importance and a corresponding network importance. In yet another embodiment, the weighting factor is a combination of the individual's importance to the network, the network's importance to the individual, and the importance of the network to other networks. As such, the individual preferences are again weighted with a relative network importance. Other combinations may also be used.

By way of example, in one exemplary embodiment one or more of the metrics described in FIG. 3 are measured. Each of these measured metrics may be summed, and then normalized to a scale of 0 to 1. This weighted factor may then be multiplied by each person's request, thereby providing a weighted request set from which a group preference may be generated.

The group preference is generated from the weighted individual preferences at step 105. Where the group preference is a content selection, the content is selected and broadcast, based upon the group preference, at step 106. As noted above, examples of content include video content, audio content, sensory content—such as thermostat settings, or combinations thereof.

Figure 4:
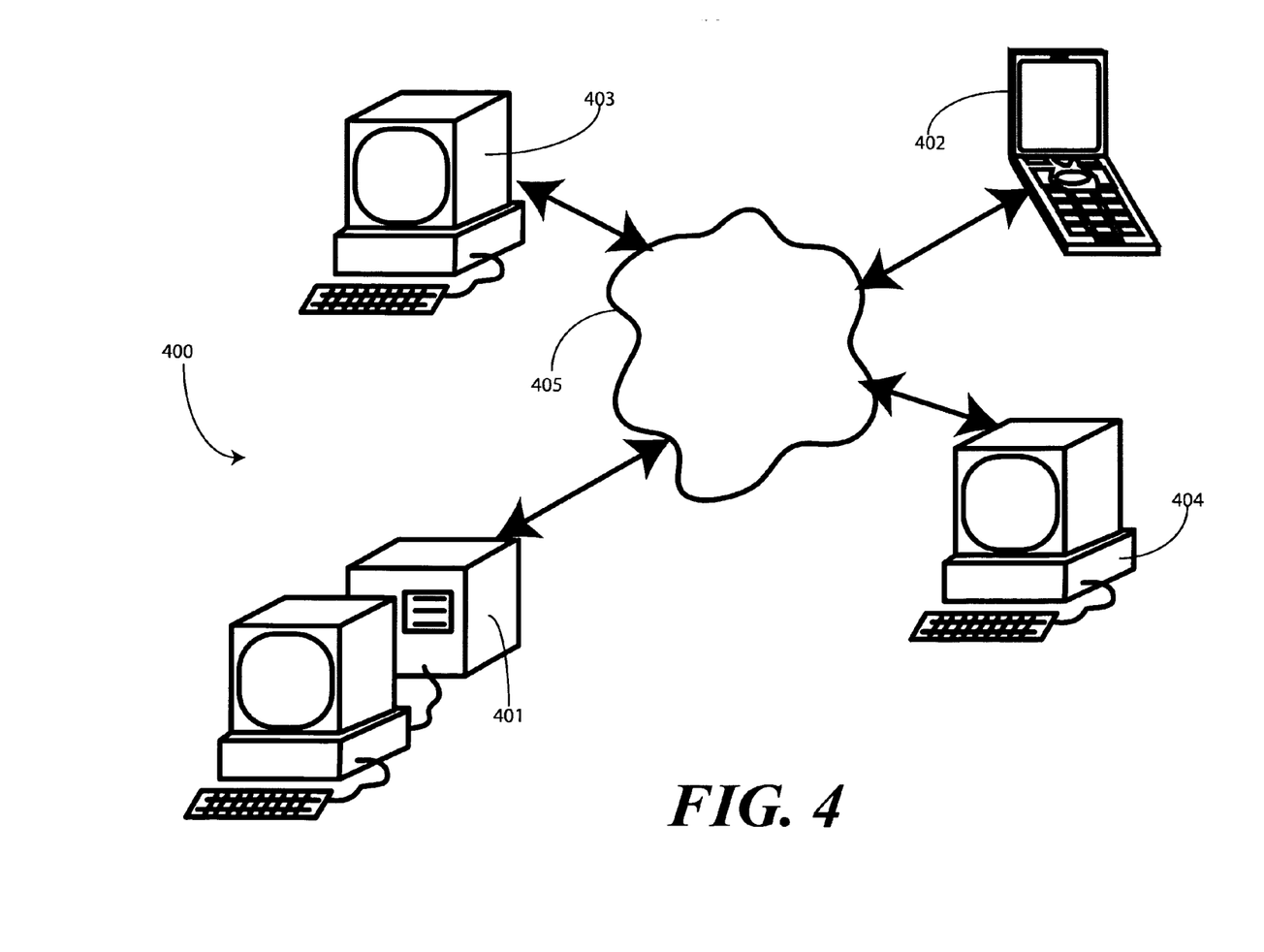
FIG. 4 illustrates one system level diagram for electronic communication in a social network in accordance with the invention.
Figure 5:
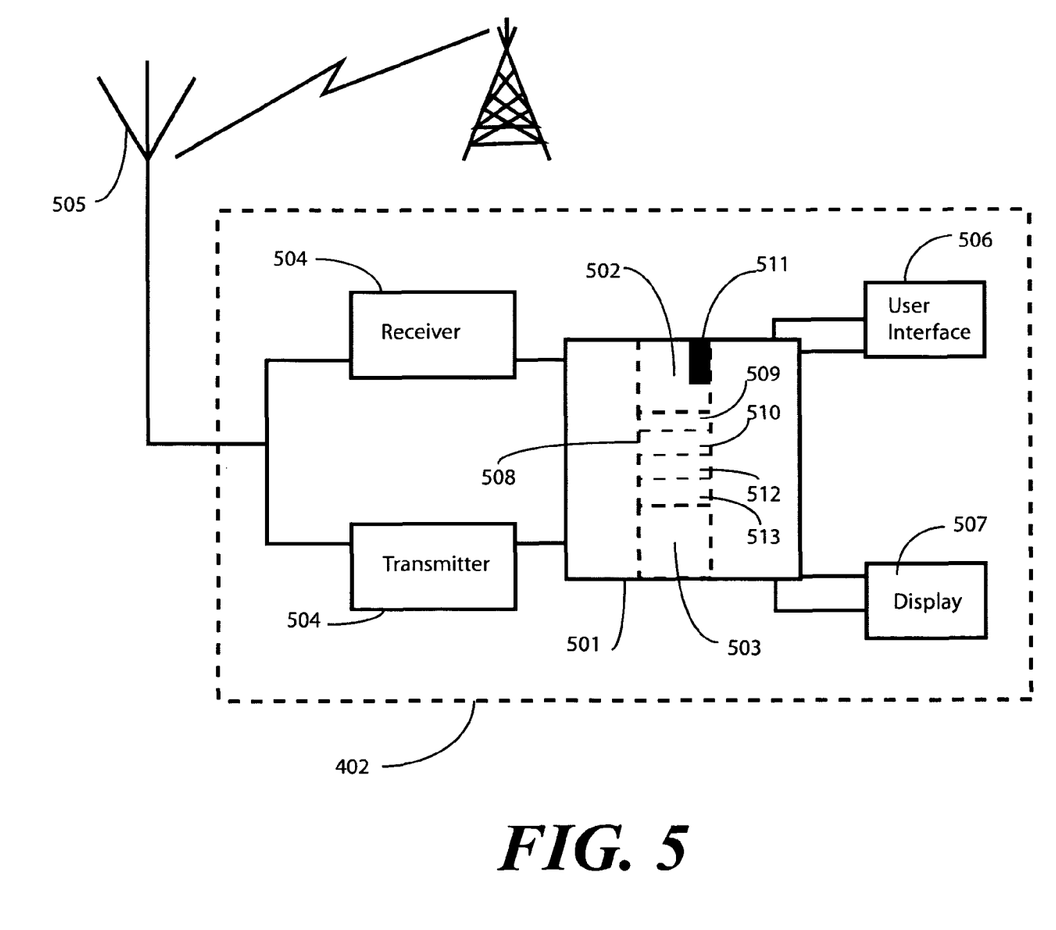
FIG. 5 illustrates one example of a portable electronic device for use in electronically determining a group preference in a social network in accordance with embodiments of the invention.

Turning now to FIG. 4, illustrated therein is a hardware block diagram of both a social network group preference determination apparatus 401 and a portable electronic communication device 402 for use in electronically determining a group preference from a plurality of individual preferences in accordance with embodiments of the invention. Such a system 400 serves as one electronic hardware configuration for generating the group preference of a social network as described herein. The illustration of FIG. 4 is intended to be illustrative only. Other configurations and devices suitable for use will be obvious to those of ordinary skill in the art having the benefit of this disclosure. Note also that not all components of FIG. 5 are necessary to practice embodiments of the invention.

A social network group preference determination apparatus 401, such as a central computer with associated memory, is capable of electronically communicating with a portable electronic communication device 402. Examples of suitable portable electronic communication devices include mobile telephones, pagers, portable computers, personal digital assistants, gaming devices, multimedia devices, and so forth. The social network group preference determination apparatus 401 communicates with the portable electronic communication device 402, in one embodiment, across a network 405. The network may be a server-client type network, a peer-to-peer network, or other suitable communication networks.

The social network group preference determination apparatus 401 includes executable software for executing steps to electronically determine a group preference in a social network from a plurality of individual preferences, each individual preference being weighted by one or more weighting factors. The method of FIGS. 1-3, for instance, may be coded into executable code operable with a processor of the social network group preference determination apparatus 401.

The portable electronic communication device 402, in one embodiment, includes at least one individual preference stored in memory. The social network group preference determination apparatus 401 is capable of retrieving the preference so as to determine its owner's preferences. Alternatively, individual preferences may be directly sent to the social network group preference determination apparatus 401 from a client terminal 403 capable of communication with the network 405.

In some embodiments, the social network group preference determination apparatus 401, which may be a hardware, hardware with integrated software, or software device, may be directly linked with the system affected by the group preference. In the example of a party, where a DJ or band desires to know which music to play, the social network group preference determination apparatus 401 may be directly linked to the music system. Hence, upon determining the group preference as to which song to play, the social network group preference determination apparatus 401 may directly cause that song to be played.

However, in other applications, the social network group preference determination apparatus 401 will be only a decision maker or information gatherer. Other systems will take over once the group preference is determined. Consider, for example, that the social network group preference determination apparatus 401 is a television set-top box configured to receive audio-visual data from a carrier, such as a cable or satellite broadcasting company. Where the content is available on demand, the social network group preference determination apparatus 401 may determine the group preference and then transmit the group preference to a third party device 404. Alternatively, the social network group preference determination apparatus 401 may only compile weighted individual preferences. The third party device 404 would then be responsible for selecting and broadcasting the content to the group in accordance with the group preference. In other embodiments, the social network group preference determination apparatus 401 may only transmit a list of weighted individual preferences to the third party device 404, as the third party device 404 may have its own proprietary selection algorithms operable with the weighted individual preferences.

Turning now to FIG. 5, illustrated therein is one embodiment of a portable electronic communication device 402 for use in electronically determining a group preference from a plurality of weighted, individual preferences in accordance with embodiments of the invention. For discussion purposes, the portable electronic communication device 402 will be described as a mobile telephone, as many people today carry mobile telephones with them wherever they go. Additionally, people often communicate—either with voice or via text message—with mobile telephones within social networks. It will be obvious to those of ordinary skill in the art having the benefit of this disclosure, however, that the invention is not so limited. Any other form of portable electronic communication device may be used in accordance with embodiments of the present invention.

The portable electronic communication device 402 includes standard components, such as a central processor 501 and associated memory 502,503 for executing the functions of the portable electronic communication device 402. An input 506 receives information from a user, while a display 507 presents information to the user. A communication circuit 504, as well as a corresponding antenna 505, is used to communicate with a network (405).

To be used for electronically determining a group preference from a plurality of individual preferences, in one embodiment the portable electronic communication device 402 includes a plurality of modules, illustrated generally by block 508. These modules, while they could be designed as hardware or programmable logic, often take the form of executable code or data stored in the memory 502,503 that are operable with the processor 501.

A preference module 509 includes individual content preference information. This content preference information may be preferred songs, video clips, television programs, movies, plays, or other preferred content to which the device's user is partial. In one embodiment, the preference module 509 includes a user profile into which the user has entered many preferences. In another embodiment, the preference module 509 is developed over a period of time through monitoring of the user's activities, such as what song is played most frequently or what websites are viewed most often.

An optional social network relevance module 510 has information relating to an individual's importance relative to a social network. The social network relevance module 510 may include membership status in various social networks. It may also include logistical information, such as the date or time that the user joined the group, or the duration since the user started communicating with the group.

When in use with embodiments of the present invention, the relevance of the social network and the user's preferences are transmitted to a social network group preference determination apparatus (401) by way of the communication circuit 504. The communication circuit 504 works as a communication module that is configured to transmit both the individual content preference information and the information relating to the individual user's importance relative across a network (405) to the social network to the social network group preference determination apparatus (401), which may be located remotely.

Where the importance of the social network to the member is used in generating the group preference, social network importance information 511 may be stored in the memory. A social network identification module 512 is then configured to determine when the portable electronic communication device 402 is within a particular social network. This can be accomplished, for example, through local area communication such as Bluetooth or ZigBee. When the portable electronic communication device 402 is within local area communication capability with another member of a social network, such as a member in a particular address book, the social network identification module 512 alerts the processor 501. By analyzing the social network importance information 511 stored in memory 502,503, a social network importance determination module 513 is then configured to determine the importance of the identified social network to the individual user based upon the social network importance information 511. This importance of the social network to the individual user may then be transmitted to the social network group preference determination apparatus (401) across the network (405).

Figure 6:
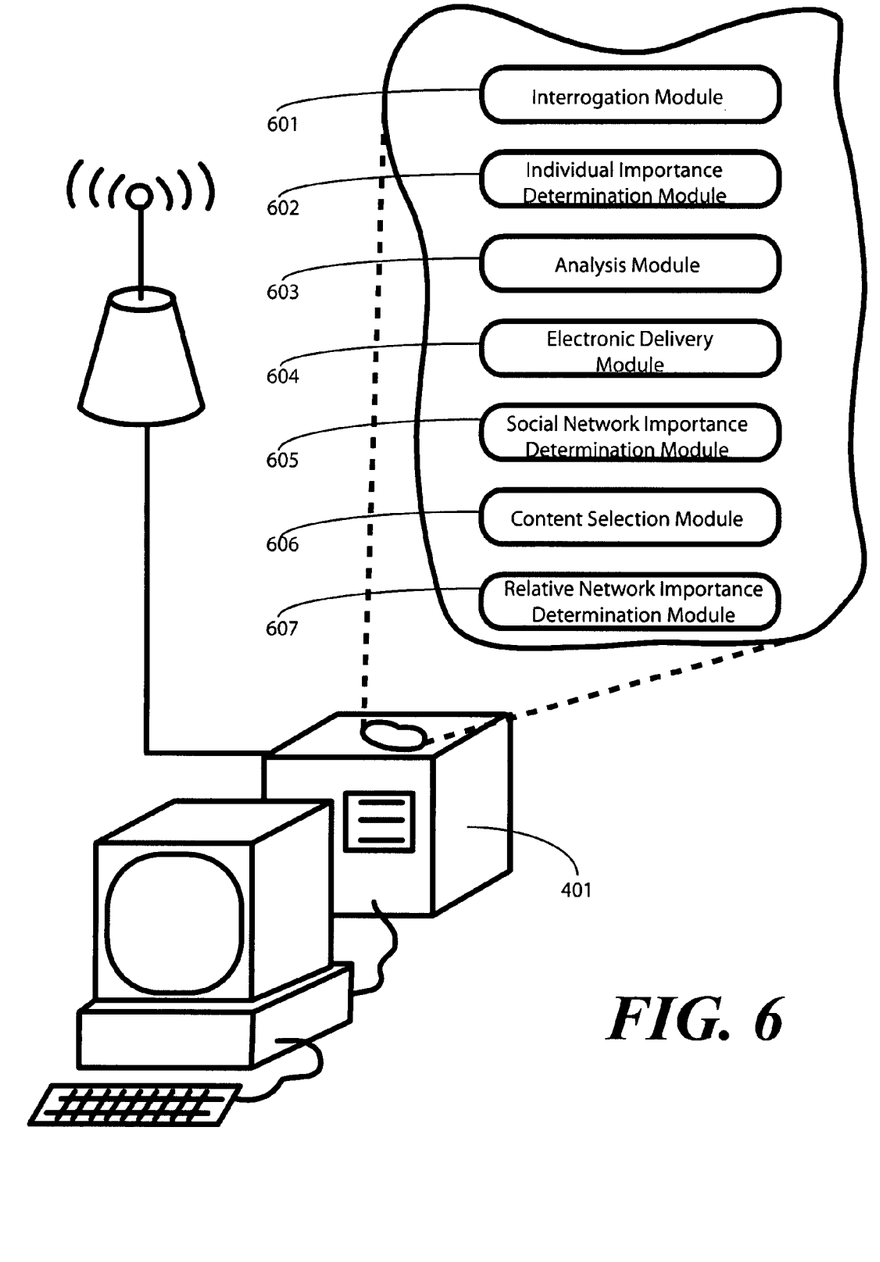
FIG. 6 illustrates one example of a social network group preference determination apparatus in accordance with embodiments of the invention.

Turning now to FIG. 6, illustrated therein is one exemplary embodiment of a social network group preference determination apparatus 401 in accordance with embodiments of the invention. The social network group preference determination apparatus 401 is configured for communication with portable electronic communication devices (402) across a network (405). The social network group preference determination apparatus 401 includes a plurality of software modules, operable with a processor, to determine a group preference from a plurality of individual preferences.

An interrogation module 601 is configured to determine individual content preference information relating to the members of a social network. This individual content preference information corresponds to likes or dislikes of each member, and can be obtained by electronic communication with the portable electronic communication devices (402) belonging to the members of the network.

An individual importance determination module 602 is configured to determine the individual's importance to the social network by either monitoring the electronic communication activity of the portable electronic communication devices (402) or by retrieving predetermined individual importance data from memory as described above. Where the individual importance determination module 602 determines the individual's importance to the social network by monitoring electronic communication activity, the individual importance determination module may take advantage of a peer-to-peer or server-client communication module that is integrated therein. The individual importance to the social network may be calculated or estimated as described above in the method of FIGS. 1, 2, and 3.

An analysis module 603 is then configured to weight the individual content preferences with a score indicative of the individual's importance to the social network. An electronic delivery module 604 is then configured to transmit the individual content preferences weighted with the individual's importance to the social network as weighted preferences. As described above, this information may be transmitted to a third party or third party device (404).

An optional social network importance determination module 605 may be provided to determine the importance of the social network to one or more members of the social network. As such, the social network importance determination module 605 may be configured to either electronically interrogate one or more portable electronic communication devices (402), or to retrieve and reference predetermined social network importance data corresponding to the members of the social network from memory. Once the importance of the social network to the individual members is known, the analysis module 603 is further configured to weight the individual content preferences with the importance of the social network to the members.

Where the social network group preference determination apparatus 401 is configured to provide content corresponding to the group preference, the social network group preference determination apparatus 401 may also include a content selection module 606. The content selection module 606 is configured to receive the weighted preferences from the electronic delivery module 604 and to determine a group content selection from these weighted preferences. A broadcast apparatus 607 can then broadcast the group content selection to the social network.

As noted above, in some applications, the importance of the social network being analyzed relative to other social networks may also be considered. In such applications, a relative network importance determination module 607 may be provided. The relative network importance determination module 607 can be configured to determine the relative importance of the social network to other social networks. This determination may be made, for example, by referencing a predetermined ranking list of social networks stored in memory.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of electronically determining a group preference in a social network from a plurality of individual preferences of members of the social network, the method comprising:
    determining when a portable electronic communication device is in communication with the social network;
    obtaining individual preferences from the members, wherein at least some of the individual preferences are different;
    determining an importance of the social network to at least one individual based upon social network importance information;
    determining, with one or more processors and stored program instructions configured to control the processors, an individual importance for a plurality of the members to the social network from a plurality of importance factors, the importance factors comprising at least a geographic location of a member relative to the social network and an ability of the member to contribute information to, or access information from, the network communication channels; and
    generating, with the one or more processors, the group preference from weighted individual preferences.

2. The method of claim 1, further comprising:
    determining a network importance of the social network to each of the members; and
    weighting each of the individual preferences with a corresponding network importance.

3. The method of claim 2, further comprising selecting and broadcasting content based upon the group preference.

4. The method of claim 3, wherein the content is one of video content, audio content, sensory content, or combinations thereof.

5. The method of claim 2, wherein the determining the individual preferences comprises interrogating a plurality of electronic devices belonging to the members of the social network to obtain the individual preferences.

6. The method of claim 1, wherein the determining the individual importance comprises one of:
    determining a betweenness of one or more members to other members of the social network;
    determining a closeness of the one or more members to the other members;
        determining a centrality degree of the one or more members relative to the other members;
    determining a flow betweenness centrality between the one or more members with the other members;
    determining an eigenvector centrality of the one or more members relative to the other members;
    determining a centralization of the one or more members;
    determining a clustering coefficient of the one or more members;
    determining a cohesion of the one or more members with the other members;
    determining a density corresponding to the one or more members relative to the social network;
    determining a path length of the one or more members with the other members;
    determining a radiality corresponding to the one or more members relative to the social network;
    determining a reach of the one or more members to the other members;
        determining a structural cohesion of the one or more members with the other members;
    determining a structural equivalence of the one or more members with the other members;
    determining structural or static holes in the social network; or
    combinations thereof.

7. The method of claim 1, wherein the determining the individual importance comprises retrieving predetermined importance data from a memory to determine each member's individual importance.

8. The method of claim 1, further comprising determining a relative network importance of the social network to other social networks and weighting each of the weighted individual preferences with the relative network importance.

9. The method of claim 1,
    the social network importance information stored in a memory of the portable electronic communication device.

10. The method of claim 1, wherein the each individual preference comprises one of musical content preferences or video content preferences.

11. The method of claim 1, further comprising determining an importance of the social network to one or more members of the social network by one of electronically interrogating portable electronic communication devices or by referencing predetermined social network importance data corresponding to the one or more members of the social network; further comprising weighting the each of the individual preferences with the importance of the social network to the one or more members of the social network.

12. The method of claim 1, further comprising receiving weighted preferences and determining a group content selection from the weighted preferences.

13. The method of claim 1, further comprising broadcasting the group content selection to the social network.

14. The method of claim 1, further comprising determining a relative importance of the social network to other social networks.

15. The method of claim 1, further comprising monitoring communication activity and message paths of the members within the social network to determine the plurality of importance factors for each member.

16. The method of claim 15, further comprising weighting, with the one or more processors, each of the individual preferences with a corresponding individual importance.

* * * * *